Jan. 12, 1943.   W. PARRY   2,308,204

MEANS FOR AFFECTING PLANT LIFE PROCESSES

Filed Jan. 2, 1940

WILLET PARRY
INVENTOR.

BY *[signature]*
ATTORNEY.

Patented Jan. 12, 1943

2,308,204

UNITED STATES PATENT OFFICE 2,308,204

MEANS FOR AFFECTING PLANT LIFE PROCESSES

Willet Parry, Berkeley, Calif., assignor to Ervin G. Johnson, Oakland, Calif., as trustee Application January 2, 1940, Serial No. 311,977

2 Claims. (Cl. 47—1.3)

This invention relates to a method of and apparatus for activation or suppression of biological processes, especially those processes substantially affected by high frequency electric fields.

This method provides for practical treatment of substantial quantities of stock by industrial concerns so efficiently that the benefits of such treatment are available to effect substantial industrial economy. For example, it is advantageous to treat seed bean stock having an untreated germination factor of from two to four percent and render that stock forty percent germinative. In like manner the method is effective in the activation or deactivation of fruits to accelerate or retard their life processes, and to delay or advance their maturation, as well as to otherwise control plant life through promotion of plant health as by devitalization of parasitic, fungus, and insect pests.

Industrial adaptation of high frequency treatment requires the expenditure of large amounts of energy and equipment capacity not heretofore available.

In accordance with the principles of my invention the materials to be treated are subjected to variable high voltage and high frequency electric fields, being passed therethrough for a period of time dependent upon empirical determination of effectiveness. The requisite energy capacity for industrial application is made available between two electrodes, or electrically conductive plates, the dimensions of which are so calculated with respect to the frequency of the electric field required that these two electrodes have resonant characteristics, that is to say, a maximum proportion of available energy is available for activation of the material between the plates.

The frequency of the energy pulses supplied to the plates is preferably maintained at the resonant frequency of the two plates by an electric oscillating circuit, an oscillator being so related to the electrodes that the voltage of the energy passing to the electrodes is varied in accordance with the oscillator energy wave, in such fashion that an oscillating resonant field is set up between the plates.

For practical results, the useful energy expended for materials treatment is so large that it is impractical to permit its flow in ordinary oscillating circuits such as have heretofore been employed.

Figure 1:
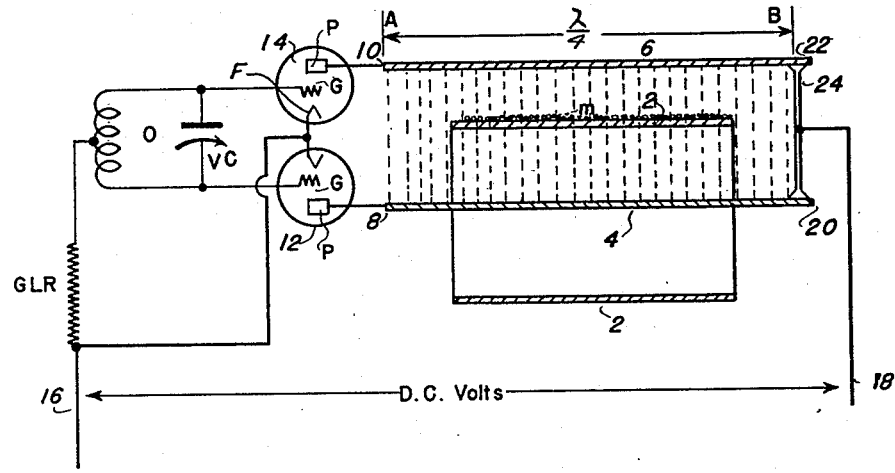
Figure 1 is a circuit diagram, partially fragmentarily elevational, of the apparatus.
Figure 3:
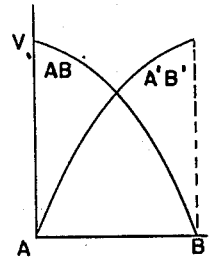
Figure 3 is a voltage stress diagram.

The materials $m$ to be treated are carried by an endless belt 2, one reach of which passes through an electric field produced by an oscillating voltage difference existing between a pair of conducting plates 4 and 6 to the adjacent ends 8 and 10 of each of which are attached a high frequency electric energy supply, here comprising the plates P of power vacuum tubes 12 and 14. The filaments of these tubes are attached to the negative terminals of a power supply 16, the positive bus 18 of which supply is electrically connected to the remote ends 20 and 22 of plates 4 and 6 as by a slide contactor 24.

The distance between the points A and B in meters is calculated as 300,000,000 divided by four times the frequency in cycles per second, or one-quarter wave length of the frequency to be used. Accordingly, if the frequency required for a particular processing is 15,000,000 cycles per second, the distance AB is five meters. As the frequency increases, AB becomes shorter and the slider 24 may be adjusted for this requirement, or plates of different lengths may be provided, integrated therewith at 20 and 22, for each frequency required.

The energy passing to the plates 4 and 6 is controlled by the oscillator circuit grids G which form the termini of the variable oscillator circuit O, and which receives its energy from the direct current source 16—18.

A variable capacitor VC adjusts the oscillator frequency and voltage thereof is applied on the grids G, which, in turn, influence the flow of current from the filaments F to the plates 4 and 6 so that the natural or resonant frequency of the oscillator circuit is exactly equal to the resonant frequency of the lines 4 and 6.

If a larger capacity is desired the widths of the plates 4 and 6 may be increased and the speed of travel of the belt 2 may be enlarged in accordance with the demand for additional capacity.

As illustrated, the field is created by a resonant line, short circuited at its remote end. Other resonant lines and oscillating circuits may be employed, with a generally like effect, but that described is preferred.

As illustrated, employing the plates 4 and 6 alone, and moving the stock $m$ transversely to the length AB, it is evident that the voltage stress varies from A to B, being at all times a maximum at A and zero at B, and distributed according to the nature of the imposed sine wave from A to B. Accordingly, diverse portions of the material along the belt from A to B are subjected to different voltage gradients and this fact must be taken into account. If voltages between limits are satisfactory, the position of the material on the belt may be specified for this exigency.

If uniform treatment is desired, the material may be moved in the direction AB or BA, so that all of it passes through the same section across the line AB.

Treatment between certain voltage limits is often satisfactory and in such instances the arrangement employing an additional set of plates 4'—6' which are shorted at B' and have input terminals at A', in opposed physical relation to AB, is useful. The material at the midpoint is subjected to the least stress, which would be the minimum available for any constant condition, while the maximum voltage would be available between the ends of the plate pairs respectively.

Figure 2:
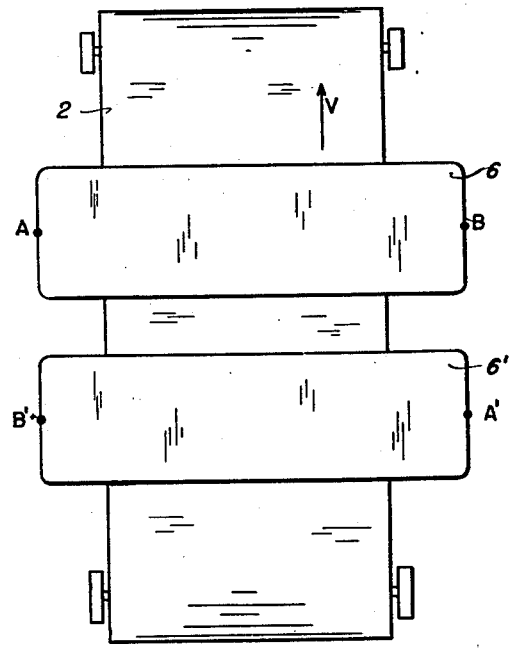
Figure 2 is a fragmentary plan.

Instead of using the belt 2, the plates 4 and 6 may be juxtaposed in vertical planes, as imaginable in connection with Figure 2, and so proportioned with respect to velocity of free fall, or restrained fall, of material in process therebetween, that the required length of treatment is obtained.

It has been pointed out that large quantities of energy may be usefully expended incident to the resonant condition between plates 4 and 6 without, however, dissipating excessive quantities of waste energy due to resistance and electromagnetic losses. This is made possible by the resonant characteristics of the plates, their large size in respect of the material to be treated, and their size in comparison with the wave length.

Having described my invention and explained the principle of its operation both in the method and a preferred embodiment of apparatus for carrying out that method in accordance with the statute, it will be apparent that other variations of the invention may be resorted to by those skilled in the art for the purpose of accomplishing one or more of the useful results flowing therefrom without departing from the spirit of the invention. It is therefore to be understood that the disclosed embodiments are illustrative only, and the following claims are referred to for a definition of that for which the inventor is secured protection hereby.

I claim:

1. In an apparatus for treating plant or animal life; a pair of spaced parallel plates having quarter wave-length dimensions providing a pathway therebetween in a direction transverse of the quarter wave-length dimension of said plates, means for applying an electrical energy wave having a length of from four times the said wave-length dimensions to one terminus of each of said plates, and means for conveying materials along said pathway.

2. An apparatus as in claim 1, and a duplicate thereof electrically symmetrical with respect thereto as regards the said path.

WILLET PARRY.

CERTIFICATE OF CORRECTION.

Patent No. 2,308,204. January 12, 1943.

WILLET PARRY.

It is hereby certified that error appears in the printed specification of the above numbered patent requiring correction as follows: Page 2, second column, line 25, after "of" strike out "from"; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.